(12) United States Patent
Comparan et al.

(10) Patent No.: US 8,719,507 B2
(45) Date of Patent: *May 6, 2014

(54) NEAR NEIGHBOR DATA CACHE SHARING

(75) Inventors: Miguel Comparan, Rochester, MN (US); Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 33 days.

This patent is subject to a terminal disclaimer.

(21) Appl. No.: 13/343,236

(22) Filed: Jan. 4, 2012

(65) Prior Publication Data

US 2013/0173860 A1    Jul. 4, 2013

(51) Int. Cl.
*G06F 12/00*    (2006.01)
*G06F 12/08*    (2006.01)

(52) U.S. Cl.
CPC ........ *G06F 12/0811* (2013.01); *G06F 12/0817* (2013.01); *G06F 12/0897* (2013.01); *G06F 12/0893* (2013.01); *G06F 12/0895* (2013.01)
USPC ........... 711/122; 711/100; 711/117; 711/118; 711/119; 711/205; 711/207; 711/E12.043; 711/E12.017; 711/E12.024; 711/E12.027

(58) Field of Classification Search
CPC ............ G06F 12/0811; G06F 12/0817; G06F 12/0893; G06F 12/0895; G06F 12/0897
USPC ......... 711/122, 100, 117, 118, 119, 205, 207, 711/E12.017, E12.024, E12.027, E12.043
See application file for complete search history.

(56) References Cited

U.S. PATENT DOCUMENTS

| 4,827,401 | A * | 5/1989 | Hrustich et al. ............. 713/400 |
| 7,805,577 | B1 | 9/2010 | Mattina et al. |
| 7,853,755 | B1 | 12/2010 | Agarwal et al. |
| 7,882,307 | B1 | 2/2011 | Wentzlaff et al. |
| 2001/0034816 | A1 | 10/2001 | Michael et al. |
| 2003/0140197 | A1 | 7/2003 | Vanderwiel |
| 2009/0089546 | A1 | 4/2009 | Lakshmanamurthy et al. |

OTHER PUBLICATIONS

Barrow-Williams, Nick et al., Proximity coherence for chip multiprocessors, Proceedings of the 19th international conference on Parallel architectures and compilation techniques, 2010, pp. 123-134, ACM, New York, New York, United States.

(Continued)

*Primary Examiner* — Midys Rojas
(74) *Attorney, Agent, or Firm* — Patterson & Sheridan LLP

(57) ABSTRACT

Parallel computing environments, where threads executing in neighboring processors may access the same set of data, may be designed and configured to share one or more levels of cache memory. Before a processor forwards a request for data to a higher level of cache memory following a cache miss, the processor may determine whether a neighboring processor has the data stored in a local cache memory. If so, the processor may forward the request to the neighboring processor to retrieve the data. Because access to the cache memories for the two processors is shared, the effective size of the memory is increased. This may advantageously decrease cache misses for each level of shared cache memory without increasing the individual size of the caches on the processor chip.

16 Claims, 7 Drawing Sheets

(56) References Cited

OTHER PUBLICATIONS

Harris, Sarah Leilani, Synergistic Caching in Single-Chip Multiprocessors: A Dissertation Submitted to the Department of Electrical Engineering and the Committee on Graduate Studies of Stanford University in Partial Fulfillment of the Requirements for the Degree of Doctor of Philosophy, Mar. 2005, Stanford University Press, Palo Alto, California, United States.

Brown, Jeffrey A. et al., Proximity-Aware Directory-based Coherence for Multi-core Processor Architectures, Proceedings of the nineteenth annual ACM symposium on Parallel algorithms and architectures, 2007, pp. 126-134, ACM, New York, New York, United States.

Tarjan, David et al., The Sharing Tracker: Using Ideas from Cache Coherence Hardware to Reduce Off-Chip Memory Traffic with Non-Coherent Caches, Proceedings of the 2010 ACM/IEEE International Conference for High Performance Computing, Networking, Storage and Analysis, 2010, pp. 1-10, IEEE Computer Society, Washington, DC, United States.

IBM Technical Disclosure Bulletin, vol. 23, No. 8, Jan. 1981, pp. 3667-3668, "Shadow Directory for Attached Processor System", C. H. Ngai and E. R. Wassel.

Kirk, David B., "An Enhanced Snoopy Cache Design for Real-Time Multi-Processing", Fourth Euromicro Workshop on Real-Time Systems, Jun. 1992, pp. 10-14.

\* cited by examiner

NEAR NEIGHBOR DATA CACHE SHARING

BACKGROUND

1. Field of the Invention

The present invention generally relates to data caches for processors, or, more specifically, to sharing the data caches between processors.

2. Description of Related Art

The size of the various cache levels in a cache hierarchy—i.e., Level 1 (L1) cache, Level 2 (L2) cache, etc—remains an important design feature of modern computing systems. As a cache size increases, the computer system can store more data in the cache, however, this also increases the time required—i.e., the latency—for the processor to locate the data within the cache. Thus, larger caches have better hit rates but greater latency. Moreover, because caches are typically located proximate to the processors that request the data—e.g., on the same semiconductor chip where space is limited—increasing the size of the cache to store more data may not be possible. These considerations must be balanced when decided deciding the size of the cache memories.

SUMMARY

Embodiments of the invention provide a method, system and computer program product for accessing data caches associated with multiple processors. The method and computer program product comprising searching a first directory to determine if a first cache memory associated with a first processor contains data necessary to perform an instruction executed by the first processor where the first directory comprises an index of the data stored in the first cache memory. The method and computer program product comprising searching a second directory to determine if a second cache memory associated with a second processor contains the necessary data where the second directory comprises an index of the data stored in the second cache memory. Upon determining that the data is located in the second cache memory, the method and computer program product also comprise transmitting a request to the second processor to retrieve the data from the second cache memory. Upon determining that the data is not located in the first and second cache memories, the method and computer program product also comprise transmitting a request to a different memory associated with the first processor to retrieve the data.

The system comprises a first processor and a second processor. The system also comprises a first cache memory in the first processor and a second cache memory in the second processor. The system includes a first directory in the first processor comprising an index of the data stored in the first cache memory, where searching the index of the first directory indicates whether the first cache memory contains data necessary to perform an instruction executed by the first processor. The system also comprising a second directory in the first processor comprising an index of the data stored in a second cache memory of the second processor, where searching the index of the second directory indicates whether the second cache memory contains the necessary data. Upon determining that the data is located in the second cache memory, the system transmits a request to the second processor to retrieve the data from the second cache memory. Upon determining that the data is not located in the first and second cache memories, the system transmits a request to a different memory associated with the first processor to retrieve the data.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
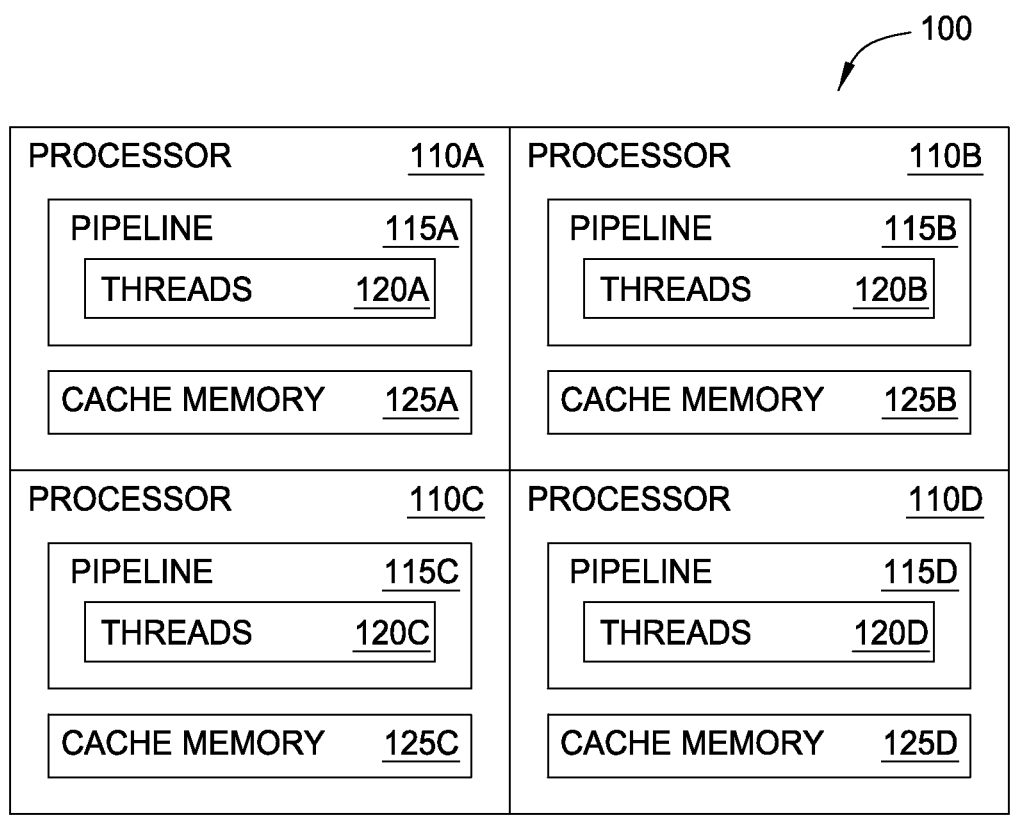
FIG. 1 is a chip with multiple processors, according to one embodiment of the invention.

The L1 cache memories for a plurality of computer processors may be shared to effectively create one single (i.e., virtual) L1 cache. Doing so does not require increasing the physical size of the L1 cache but may increase the likelihood of a cache hit—i.e., at least one of the shared L1 caches contains the requested data. Advantageously, accessing a L1 cache of a neighboring processor takes less clock cycles, and thus, less latency, than accessing the processor's L2 cache or other memory located off chip.

In many high performance computers where hundreds of individual processors may be located within close proximity of one another—e.g., on the same semiconductor chip or semiconductor substrate—the processors may be executing threads that are constantly loading, manipulating, and storing the same data. For example, the processors in a parallel computing system may be executing different tasks within the same user submitted job. If these tasks are related, then the processors are likely pulling from main memory copies of the same data and storing this data in their respective cache memories for quick access. Accordingly, providing access for neighboring processors to fetch information from a processor's L1 cache effectively increases the cache size of the processor without increasing the real estate on the chip taken up by the caches.

When a processor searches for data to perform an instruction in its pipeline, the processor may determine whether that data is stored in its own L1 cache. The processor may also determine if the data is located in a neighboring processor's L1 cache. If the data is not in its own cache but is located in its neighbor's L1 cache, it may send a request for the data to its neighboring processor. The request may then be injected into the pipeline of the neighboring processor such that the data from the neighbor's L1 cache is forwarded to the requesting processor. That is, the neighboring processor treats the request as if the request originated within its own pipeline.

However, after the data is retrieved, it is forwarded back to the requesting processor instead of being used by the pipeline of the neighboring processor.

Moreover, the processor may contain arbitration logic that determines when to inject a request for data into the neighboring processor's pipeline. For example, the logic may wait until the neighboring processor is idle or has a hole in its pipeline before injecting the request to ensure the request does not disrupt the neighbor's pipeline. Or the arbitration logic may prioritize processors such that if a request is received from a higher priority processor, the lesser priority processor's pipeline is interrupted to inject in the request. However, if the logic determines that the request should wait, the processor may include a queue for storing the requests until they can be injected.

If the data requested by the processor is not located in either the local L1 cache or a neighboring processor's L1 cache, the request may then be forward to a different cache level in a cache hierarchy or to RAM located off the chip.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a chip with multiple processors, according to one embodiment of the invention. Computer processors fabricated on semiconductor wafers may include hundreds if not thousands of individual processors. As used herein, a "processor" includes one or more execution units with at least one cache memory. Thus, for a processor that has multiple processor cores, each processor core may be considered as an individual processor if it includes at least one independent execution unit and at least one individual cache memory level. The chip 100 includes four individual processors 110A-D. These may be separate processors or cores for a single multi-core processor. Each processor 110A-D has one or more pipelines 115A-D that is typically made up of two or more execution stages. Generally, the pipelines are used to execute one or more threads 120A-D. For example, a multi-thread processor may use a single pipeline to execute multiple threads simultaneously such that if one thread stalls because of, for example, a cache miss, another thread may be executed in the pipeline while the thread waits for data to be fetched from memory. In one embodiment, the threads 120 access the same set of data stored in the main memory or other storage.

The cache memories 125A-D may represent a single level of cache memory or a cache hierarchy—e.g., a L1 cache, L2 cache, L3 cache, etc. In one embodiment, at least one of the cache memories 125 is in an area of the chip 100 set apart for the processor—e.g., the L1 cache is within the geometric boundaries of the processors 110 on the chip 100—while the other cache memories 125 may be located elsewhere on the chip 100.

In one embodiment, at least one level of the cache memory 125 may be written to by only one processor 110 while other levels of cache memories 125 may be written to by multiple processors 110. For example, in chip 100, each processor 110A-D may have individual L1 caches that may only be written to by the processor to which it is connected, however, the L2 caches may be written to and read from two or more processors 110. Moreover, processors 110A and 110B may share access to a same coherent L2 cache while processors 110A-D all share access to the same coherent L3 cache. Advantageously, for processors that are executing threads that access the same set of data, sharing levels of coherent cache may save real estate without costing the system latency.

Figure 2:
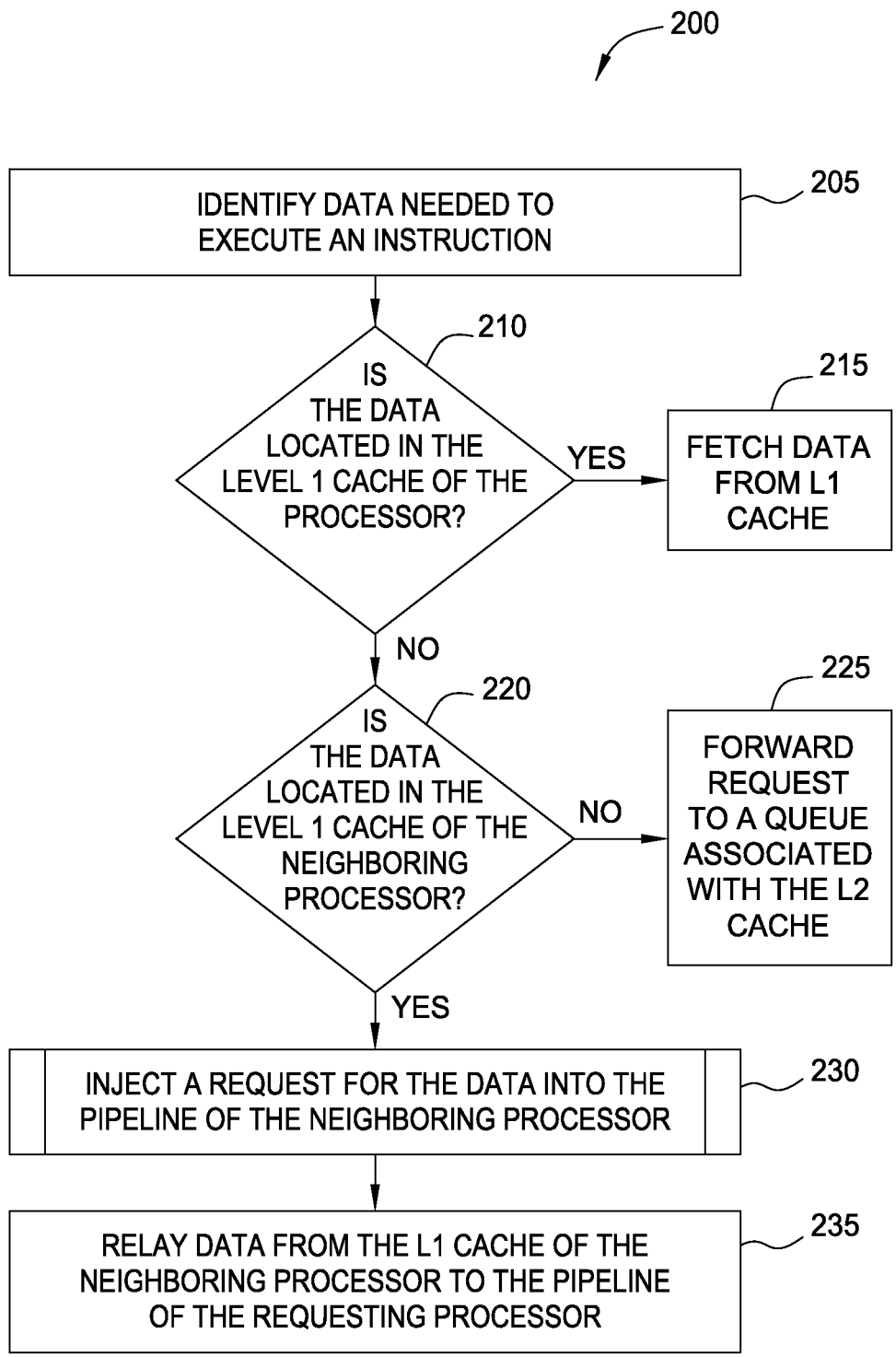
FIG. 2 is a flow diagram for accessing a L1 cache in a neighboring processor, according to one embodiment of the invention.

FIG. 2 is a flow diagram for accessing a L1 cache in a neighboring processor, according to one embodiment of the invention. Even though the L1 cache (or any other cache memory) may be exclusive to each processor such that other processors cannot write data to the cache, the chip 100 may provide a data path (i.e., one or more deposited conductive traces) for a neighboring processor to read data from the L1 cache of a neighboring processor.

Figure 3:
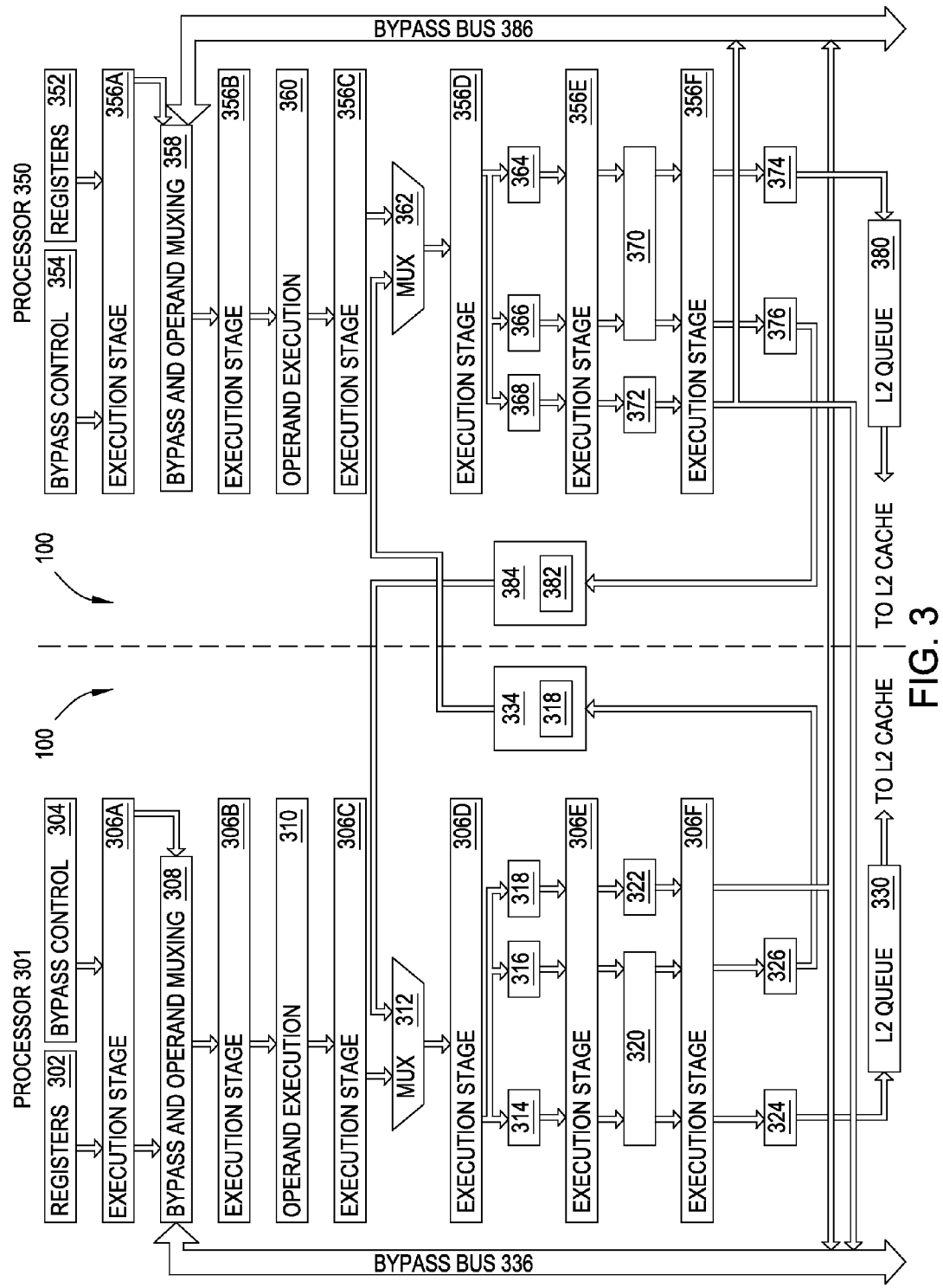
FIG. 3 is a system architecture view of a plurality of processors that share L1 cache memory, according to one embodiment of the invention.

FIG. 3 is a system architecture view of a plurality of processors that share access to a L1 cache memory, according to one embodiment of the invention. A method 200 for accessing a neighboring processor's L1 cache is shown in FIG. 2.

In one embodiment, the processor 301 was fabricated such that it is on the same semiconductor chip 100 as processor 350. The hashed line shows the division between the hardware elements included within the two separate processors 301, 350. Each processor 301, 350 includes a pipeline made up of a plurality of execution stages 306A-F and 356A-F. Each execution stage 306, 356 may represent an instruction fetch, decode, execute, memory access, write back, etc. and may include any number of stages. The pipelines may be any type of pipeline, for example, a fixed point, floating point, or load/store pipelines. Additionally, the processors 301, 350 may include any number of pipelines that may be of differing types. The pipelines shown are simplified versions of a single pipeline but the embodiments of the invention are not limited to such.

At step 205 of method 200, the current instruction being executed in the pipeline of processor 301 requires retrieving data from memory in order to complete the operation associated with the instruction. As used herein, "memory" includes main memory (e.g., RAM) located of the processor chip as well as cache memory that may be located on or off the processor chip. For example, the instruction may be a load instruction that requires the data corresponding to a certain memory address to be loaded into one of the registers 302. This instruction may be followed by an add instruction that then adds the data stored in two of the registers 302 together. Thus, in execution stages 306C-F, the pipeline determines if the data is stored in the L1 cache associated with the processor 301. If so, the data will then be fetched from the L1 cache, placed on the bypass bus 336, and injected into the pipeline at execution stage 306A. The bypass control 304 and bypass and operand muxing unit 308 allow the processor 301 to inject the retrieved data directly into the pipeline where the data is needed without first storing the data into the registers 302. The operand execution unit 310 (e.g., an ALU or multiplier/divider) may then, for example, add the data retrieved from the L1 cache with the data stored in another register 302.

At step 210, the processor 301 determines if the requested data is stored in the L1 cache. In one embodiment, each processor 301, 350 includes a local cache directory 314, 364 which contains an index of the data stored in the L1 cache (not shown). Specifically, the local cache directory 314, 364 includes the addresses of the different memory pages stored in the L1 cache. As the replacement policy of the L1 cache evicts and replaces memory pages, the processors 301, 350 update the local cache directories 314, 364. The embodiments disclosed herein are not limited to any particular replacement policy. Similarly, when changes are made to the data stored in the L1 cache that must be written to main memory, the embodiment disclosed herein are not limited to any particular write policy, e.g., write-through, write-back or copy-back.

Using the address of the requested data, the processor 301 may search the local cache directory 314 to determine if the corresponding memory page or pages is currently located in the L1 cache. If so, the result is a cache hit. If not, the result is a cache miss and the processor 301 must look elsewhere for the data.

In another embodiment, the pipeline of the processors 301, 350 may not include a separate, hardware unit that functions as the local cache directory 314, 364 but may instead index directly into the L1 cache to locate the data.

Although not shown, typical pipelines also include address translation units for converting from virtual memory addresses to physical memory address and vice versa. This translation may occur before or contemporaneously with indexing into the local cache directory 314. Nonetheless, this function is not shown for the sake of clarity.

At step 215, if the index into the local cache directory 314 results in a cache hit, the processor uses the cache load unit 318 to retrieve the data from the L1 cache. At execution stage 306E, the retrieved data is manipulated into an expected format or alignment by the fetch unit 322 and then placed on the bypass bus 336 to be transmitted to an earlier execution stage in the pipeline as discussed previously.

If the data is not located in the L1 cache, at step 220, the processor 301 may search the neighboring cache directory 316 to determine if the L1 cache of a neighboring processor—i.e., processor 350—contains the data. In a typical processor, a cache miss for the L1 cache results in the processor working its way up the cache memory (and eventually main memory or storage) to locate the data. However, in computing environments where it is expected that neighboring processors have threads that are accessing the same set of data, this fact may be exploited to effectively increase the size of the L1 cache for the processors. Specifically, a neighboring cache directory hardware unit 316 may be added to one or both of the processors 301, 350. Because the directory 316 needs to only provide an index of what is currently stored in the L1 cache of the neighboring processor, it may be much smaller physically than what would be required to increase the size of the L1 cache.

As used herein "neighboring" refers to two processors that are at least located on the same semiconductor chip 100. Additionally, the two processors may be two cores of the same multi-core processor. Even further, the neighboring processors may be fabricated such that they are mirror images of each other. That is, respective to the dashed line shown in FIG. 3, the layout of processor 301 is a mirror image of the layout of processor 350. This places several functional hardware units in close proximity to the neighboring processor to increase the ease of access to the functional units of the neighboring processor. Specifically, the arbiters 334 and 384 as well as the neighboring queues 332, 382 (whose functions will be discussed below) are located near the respective processors. Note that, however, while the location of the functional units of the two processors 301, 350 may be substantially mirror images of each other, the data buses/paths may be in different locations to facilitate transmitting data between the two processors 301, 350.

In one embodiment, the neighboring cache directory 316 may be updated by processor 350. That is, using a data path (not shown), the processor 350 may update the neighboring cache directory 316 such that it is the same as the local cache directory 364. Specifically, the processor 350 may push out updates every time it updates its own local cache directory 364. In this manner, the neighboring cache directory 316 is read-only memory for processor 301 which relies on processor 350 to ensure the information stored within the director 316 represents what is currently being stored in the L1 cache associated with processor 350. Alternatively, the processor 301 may, for example, intermittently copy the index of the local cache directory 364 of processor 350 into the neighboring cache directory 316.

In one embodiment, during execution stage 306D, the local cache directory 314 and the neighboring cache directory 316 may be accessed simultaneously. That is, the processor 301 may use the requested data's memory address to search both of the directories 314, 316 at the same time. At execution stage 306E, the resulting tags (i.e., what the memory address is compared to within the directories 314, 316) are sent to the tag compare unit 320 to determine whether a cache hit or a cache miss occurred. If the memory address is found in both directories 314, 316 (i.e., a cache hit for both directories) then in one embodiment the data is fetched from the local L1 cache. However, in other embodiments, if both the local and neighboring L1 caches store the requested data, the data may be retrieved from the neighboring L1 cache if, for example, the local L1 cache malfunctions or is currently unavailable.

Note that FIG. 3 illustrates simultaneously accessing both the cache using the cache load unit 318 and the local cache directory 314. Depending on whether the local cache directory 314 returns a cache hit or miss determines whether the data retrieved from the cache using the cache load unit 318 is forwarded or discarded. In other pipeline designs, the pipeline may wait two cycles later to access the cache using the cache load unit 318 after the determining via the local cache directory 314 that the data is in the L1 cache. The former technique may improve performance while the latter may save energy. Nonetheless, the embodiments disclosed herein are not limited to either technique.

In one embodiment, the neighboring cache directory 316 may be accessed only if the tag compare 320 reports a cache miss in the local cache directory 314. For example, a system administrator may configure the processors 301, 350 to switch to a power savings mode where the directories 314, 316 are not accessed simultaneously. This trade off may save power but add some latency. For example, the processor 301 may have to wait until execution stage 306F before it determines a cache miss in the local L1 cache. Thus, the lookup into the neighboring cache directory 316 may be delayed by approximately three clock cycles. Additionally, sharing access to the L1 caches may be configurable such that a user administrator may deactivate completely the ability of the processors 301, 350 to access each other's L1 caches.

If the tag compare unit 320 determines that both L1 caches do not have the data, then at step 225, the cache miss logic unit 324 forwards the request to a L2 cache queue 330. This queue 330 manages access to a L2 cache. The L2 cache may be coherently maintained for a plurality of processors or be accessible only by processor 301. If the memory page corresponding to the memory address of the requested data is not in the L2 cache, then the request may continue to higher levels in the cache hierarchy or to the main memory of the computer system. If the requested data is found in the L2 cache, however, the data may placed on the bypass bus 336 and routed to the correct execution stage for processing.

If the neighboring cache directory 316 results in a cache hit but the local cache directory 314 reports a cache miss, then at step 230 the processor may insert or inject a request into an the pipeline of neighboring processor 350 to fetch the data from the its L1 cache. As shown in FIG. 3, the neighbor cache hit unit 326 routes the request to the arbiter 334. The arbiter 334 may determine to not immediately inject the request into the pipeline of processor 350. If so, the request may be stored in the neighbor queue 332 for later insertion. A more detailed description of the arbiters 334, 384 is reserved for the discussion accompanying FIG. 4 below.

The arbiter 334 may use the mux 362 to inject the request into processor 350's pipeline. The mux 362 includes at least two inputs: one for receiving requests from processor 301 to retrieve data from the local L1 cache, and another for receiving requests from its own pipeline. The arbiter 334 may control the selection line of the mux 362 to control whether to insert a request from processor 301. Although not shown, the arbiter 334 may control additional logic within the execution stages 356A-F to ensure that injected the request does not corrupt the instructions and data currently found in the pipeline. For example, injecting the request may require inserting a NOP or pausing upstream execution stages 356A-C so that data is not lost.

In one embodiment, instead of inserting the request into the neighboring processor's pipeline, processor 301 may include the necessary hardware and data paths for directly retrieving the data from the processor 350's L1 cache. However, inserting the request into the neighboring processor's pipeline rather than directly retrieve the data from the neighboring L1 cache may save space on the chip 100 since the former option does not require adding redundant hardware units to processor 301 whose functions may are already be performed by hardware units found in processor 350. Thus, by adding the neighboring cache directory 316 and the arbiter 334 to processor 301 and the mux 362 to processor 350 (and the accompanying data paths) the processor 301 is able to access a neighboring L1 cache with minimal additional hardware units by taking advantage of many of the units already included with processor 350.

At step 235, once the arbiter 334 injects the data into the pipeline of processor 350 via the mux 362, the memory address in the request is transmitted to the cache load 368 which instructs the corresponding memory pages to be fetched from the L1 cache of processor 350. The fetch unit 372 manipulates the data into the expected format or alignment, and the processor 350 then routes the data to the bypass bus 336 of processor 301. From there, the bus then injects the data into processor 301's own pipeline just as if the data had been retrieved from the L1 cache located in processor 301.

The same method 200 may be performed for processor 350 to access the data stored in the L1 cache of processor 301 using the minor functional units and data paths shown in FIG. 2.

Retrieving data from a local L1 cache typically requires around four clock cycles. Retrieving data from a local L2 cache, on the other hand, requires 20-50 clock cycles. If the local cache directory 314 and neighboring cache directory 316 are accessed simultaneously, then data may be retrieved from a neighboring processor's L1 cache in approximately eight clock cycles. Accessing the directories sequentially may require approximately 12-15 clock cycles. As shown, providing access to a neighbor's L1 cache effectively doubles the size of the L1 caches and has a lower latency than accessing a L2 cache without adding more than three or four additional functional units to the processors.

In one embodiment, the processors 301, 350 can only read from a neighboring processor's L1 cache such that the requests received from a neighboring processor do not affect what data is evicted and then stored into the local L1 cache. For example, processor 350's L1 cache is read-only memory for processor 301 such that it cannot directly or indirectly write data into the L1 cache. That is, a replacement policy for processor 350's L1 cache may consider requests for data only from threads executing on the local pipeline when determining whether to invalidate and evict data in the local L1 cache. For example, many replacement policies consider which data was least recently used (LRU) when determining what data should be replaced by new data following a cache miss. Considering data that was most recently accessed by a neighboring processor may be irrelevant to the threads executing in the local pipeline. Thus, considering the accesses by the neighboring processor when determining LRU may result in evicting data that may be accessed by the threads executing in the local pipeline. Thus, in this embodiment, the accesses from the neighboring processor (e.g., processor 301) may be ignored thereby preventing processor 301 from indirectly writing data into the L1 cache.

For example, if the L1 cache for processor 350 includes memory pages that are frequently accessed by processor 301 but rarely accessed by the threads executing on processor 350, by ignoring the accesses by processor 301, the replacement policy for the cache may evict those memory pages. This may actually lead to a performance advantage since now the processor 301 may pull those memory pages into its local L1 cache which it may be able to access even faster than the L1 cache of processor 350.

Of course the system administrator may configure the system such that the replacement policy does consider accesses by neighboring processors when determining LRU. The administrator may know, for example, that the threads executing on both processors use the same data and thus may want to share the L1 caches to (1) prevent cache misses and (2) avoid constantly swapping out memory pages in the L1 cache with memory pages stored in cache hierarchy.

In one embodiment, more than two processors may be communicatively coupled to effectively increase the size of the L1 caches. For example, processor 301 may include a second neighboring cache directory that includes an index for a L1 cache located on a third processor. The third processor may be located below processor 301 and may be a mirror image relative to a horizontal line that divides the two processors. Moreover, the arbiter 334 or neighbor cache hit unit 326 may be configured to determine which of the neighboring processors have the data and route the request to the correct processor.

Figure 4:
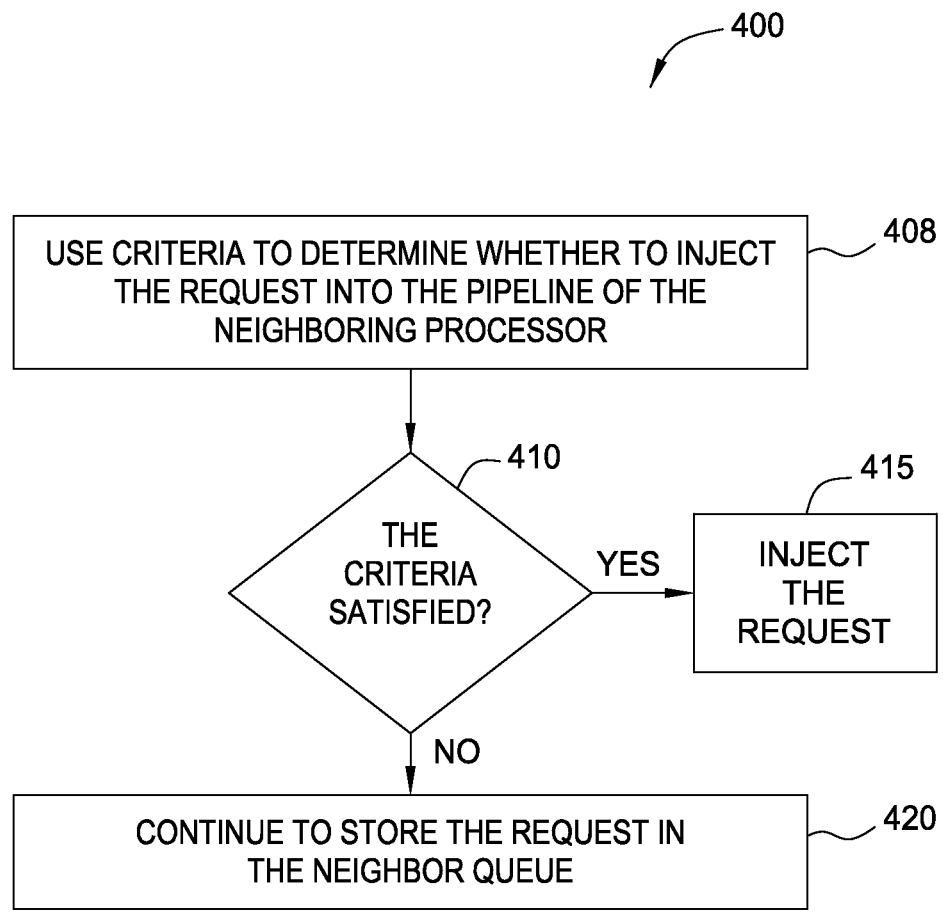
FIG. 4 is a flow diagram for determining when to inject a request to retrieve data from a L1 cache of a neighboring processor, according to one embodiment of the invention.

FIG. 4 is a flow diagram for determining when to inject a request to retrieve data from a L1 cache of a neighboring processor, according to one embodiment of the invention. Specifically, FIG. 4 illustrates a method 400 for injecting a request for data into the pipeline of a neighboring processor—i.e., step 230 of FIG. 2. As mentioned previously, the arbiter 334 may govern when to inject a request into the pipeline of processor 350. Preferably, this is done such that the instructions and data requests native to processor 350 are not interrupted, although in some cases waiting for a time where the pipeline will not be interrupted may not be desirable.

At step 405, the arbiter 334 uses predefined criteria to determine when to inject a request into the pipeline of processor 350. This criteria may include waiting for the pipeline to idle or pause, determining a priority between the processors, or relying on a predefined ratio.

The arbiter 334 ensures that injecting the request does not interfere with instructions and requests that are already executing in the execution stages 356A-F. As a processor executes, its pipeline may have a hole where data is not currently being moved or manipulated in the execution stage (i.e., a NOP or pause). Replacing a hole in the pipeline with a request to retrieve data from the L1 cache does not affect the other stages in the pipeline—e.g., the arbiter 334 does not need to pause previous stages to make sure data is not lost. Thus, in one embodiment, the arbiter 334 may wait until a hole in the neighboring processor's pipeline reaches execution stages 356C before injecting a request from the neighbor queue 332.

Additionally or alternatively, the processors 301, 350 may be prioritized based on the threads they execute. For example, if the system administrator has selected processor 301 to execute the most time sensitive threads, processor 301 may be given a higher priority than processor 350. This priority may be provided to the arbiters 334, 384. As arbiter 334 receives requests to fetch data from the L1 cache of processor 350, it may immediately inject the request into the pipeline even if it requires one or more of the previous stages 356A-B to be paused. This ensures that processor 301 receives the data from the neighboring L1 cache with the minimal amount of latency. On the other hand, arbiter 384 may only inject a request into the pipeline of processor 301 if it detects a hole in the pipeline. This ensures that processor 301 remains unaffected by processor 350.

In another embodiment, the arbiter 334 may use a ratio to determine when to inject a request into the neighboring pipeline. This ratio may be based on the priority of the processors, be provided to the arbiter 334 by the system administrator, or be defined in a parameter of a job submitted to the computer system. The ratio may, for example, define a maximum number of neighboring requests that can be inserted based on clock cycles—i.e., one inserted request per every four clock cycles—or a maximum number of neighboring requests that can be inserted for every set of native requests—i.e., one request from processor 301 per every five native requests from processor 350. The latter example ignores holes or pauses within the pipeline. Using the ratio, the arbiter 334 determines when it should insert a request into the pipeline of processor 350.

Furthermore, in some computing system with multiple processors on a chip, one or more of the processors may be powered down such that one or more of the execution stages of the pipeline is deactivated. Even if a portion of the pipeline of processor 350 is deactivated, processor 301 may use the portion shown (i.e., execution stages 356C-F) to retrieve data from processors 350's L1 cache.

At step 410, the arbiter 334 determines whether the criterion or criteria are satisfied. The criteria may be any of the criteria discussed above or a combination thereof. Moreover, this invention is not limited to only the criteria discussed above.

The neighbor queue 332 may be organized in a first-in first-out schema where the arbiter 334 uses the criteria every clock cycle to determine whether the request at the front of the queue 332 should be inserted.

Upon determining that the criteria is satisfied, at step 415 the arbiter 334 may control the select line of the mux 362 (as well as any other necessary control lines) to insert the request into the pipeline of processor 350. As discussed previously, the request is then treated like a native request that originated from an instruction executing in processor 350.

However, if the criteria are not satisfied, at step 420 the arbiter 334 continues to store the request in the neighbor queue 332. The arbiter 334 may reevaluate the criteria every clock cycle or wait for a predetermined number of cycles before again determining if the criteria are satisfied.

In one embodiment, the neighbor queue 332 may include a clock cycle count for recording how long each request has been stored in the queue 332. The arbiter 334 may use the clock cycle count to determine whether to continue to store the request in the neighbor queue 332 or forward the request to the L2 queue 330. In one embodiment, the processor 301 may include a data path (not shown) that connects the arbiter 334 with the L2 queue 330. If a request is stored in the neighbor queue 332 for a predefined number of clock cycles, the arbiter 334 may forward the request to the L2 queue 330 rather than waiting for the criteria to be satisfied so that the request is inserted into the pipeline of processor 350. For example, any request that is stored in the neighbor queue 332 for more than ten clock cycles may be forwarded to the L2 queue to retrieve the data from higher levels of the cache hierarchy.

Additionally, the arbiter 334 may use a different threshold of clock cycles depending on the requests location within the neighbor queue 332. For example, the threshold may be higher for the request that is at the front of the queue 332 but lower for those requests that are lower positions within the queue 332. This may prevent a queue 332 from backing up, especially if the arbiter 334 is configured such that it can insert a request only if there is a hole in the neighboring processor's pipeline.

Furthermore, the arbiter 334 may set a maximum number of requests permitted in the queue 332 to prevent back-up. Once that maximum number is achieved, the arbiter 334 may automatically forward received requests to the L2 queue 330.

Of course, using criteria to inject the requests is optional. In one embodiment, the arbiters 334, 384 may immediately inject the request into a neighboring pipeline once they are received.

An Example Computing System

Figure 5A:
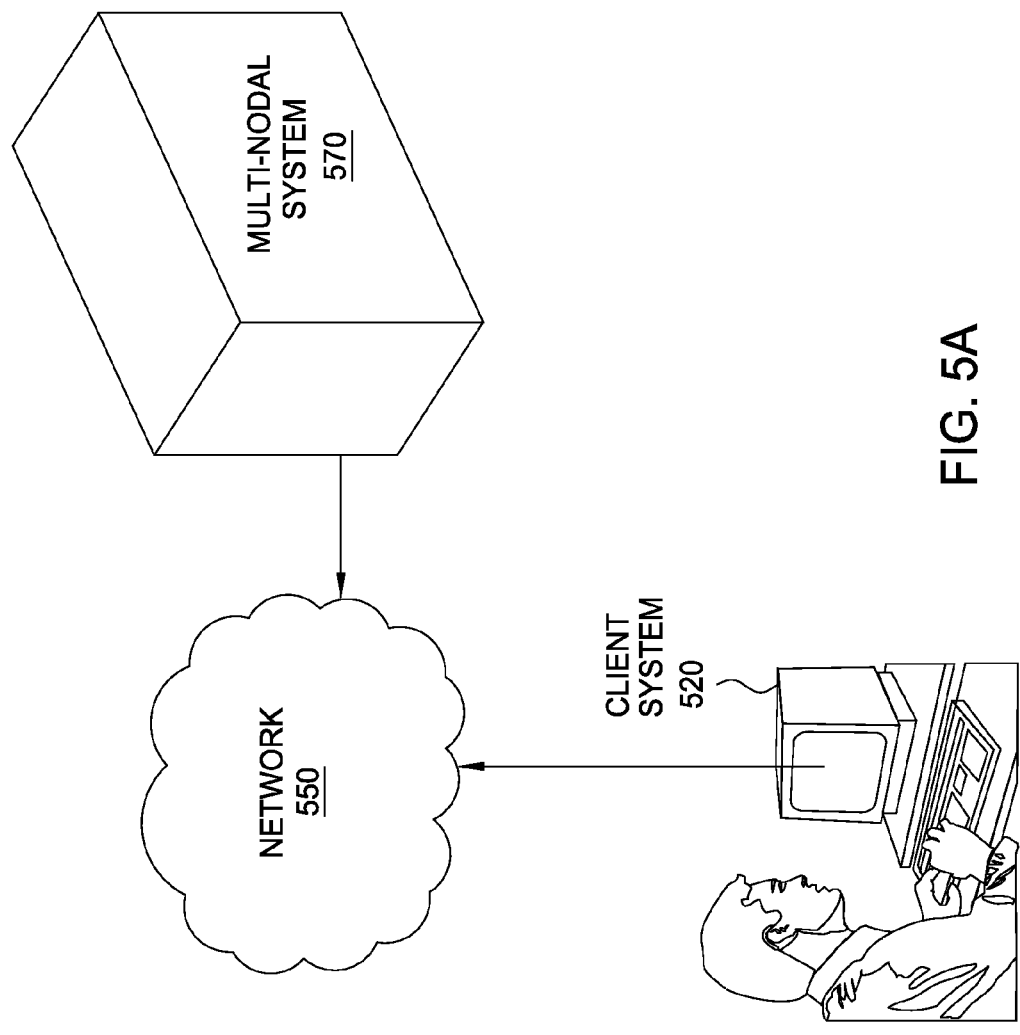
FIGS. 5A-5B are block diagrams illustrating a networked system for performing client submitted jobs on a multi-nodal system, according to embodiments of the invention.
Figure 5B:
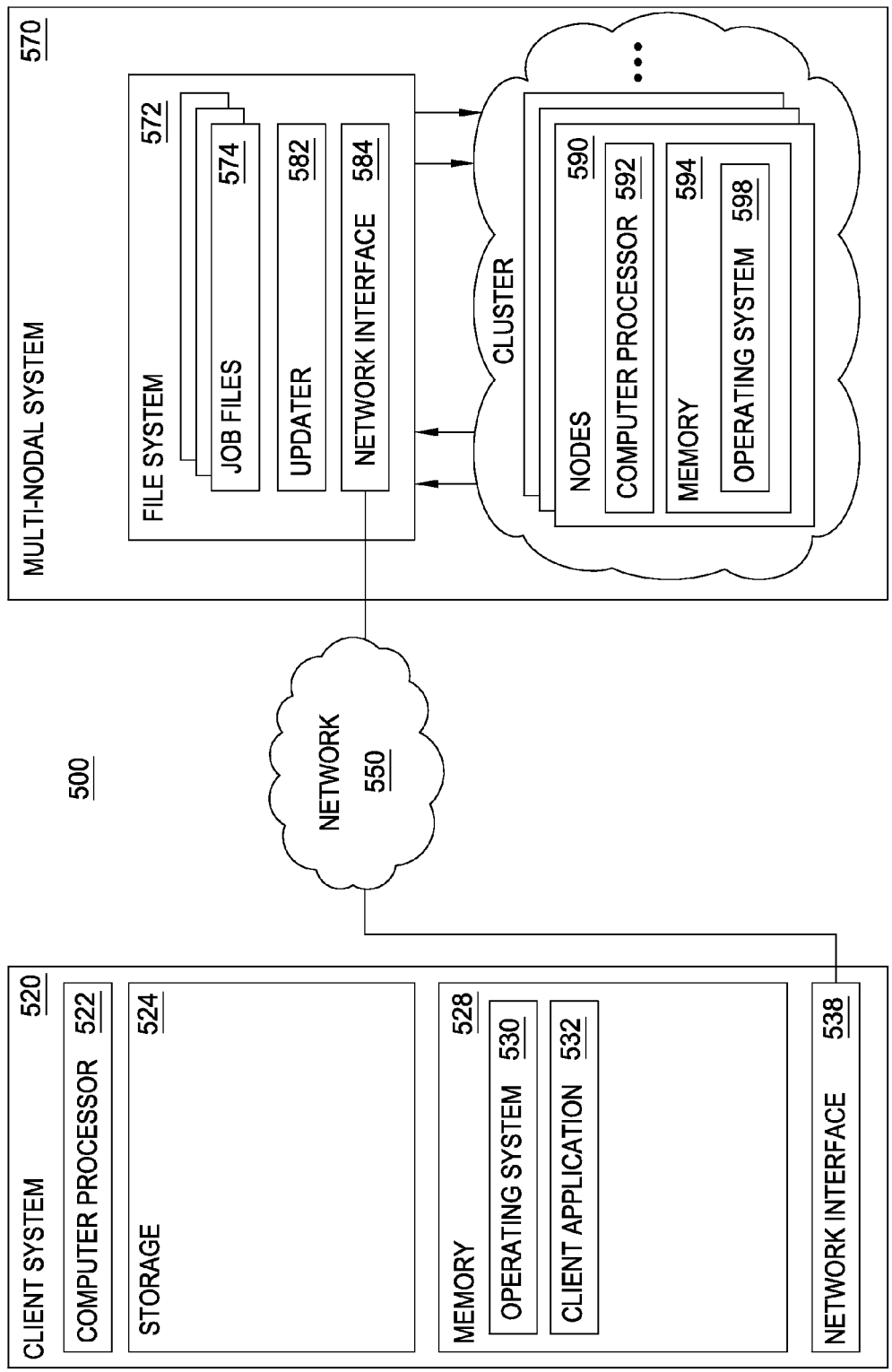

FIGS. 5A-5B are block diagrams illustrating a networked system for performing client submitted jobs on a multi-nodal system, according to embodiments of the invention. As shown, FIG. 5A is a block diagram illustrating a networked system for performing client submitted jobs on a multi-nodal system. In the depicted embodiment, the system 500 includes a client system 520 and a multi-nodal system 570, connected by a network 550. Generally, the client system 520 submits jobs over the network 550 to a file system running on the multi-nodal system 570. Nonetheless, any requesting entity may transmit jobs to the multi-nodal system 570. For example, software applications (such as an application running on the client system 520), operating systems, sub-systems, other multi-nodal systems 570 and, at the highest level, users may submit jobs. The term "job" denotes a set of commands for requesting resources from the multi-nodal system 570 and using these resources. Any object oriented programming language such as Java, Smalltalk, C++ or the like may be implemented to format the set of commands. Additionally, a multi-nodal system 570 may implement a unique programming language or provide a particular template. These jobs may be predefined (i.e., hard coded as part of an application) or may be generated in response to input (e.g., user input). Upon receiving the job, the multi-nodal system 570 executes the request and then returns the result.

FIG. 5B is a block diagram of a networked computer system configured to perform client submitted jobs on a multi-nodal system, according to one embodiment of the invention. As shown, the system 500 contains a client system 520 and a multi-nodal system 570. The client system 520 contains a computer processor 522, storage media 524, memory 528 and a network interface 538. The computer processor 522 may be any processor capable of performing the functions described herein. The client system 520 may connect to the network 550 using the network interface 538. Furthermore, as will be understood by one of ordinary skill in the art, any computer system capable of performing the functions described herein may be used.

In the pictured embodiment, memory 528 contains an operating system 530 and a client application 532. Although memory 528 is shown as a single entity, memory 528 may include one or more memory devices having blocks of memory associated with physical addresses, such as random access memory (RAM), read only memory (ROM), flash memory or other types of volatile and/or non-volatile memory. The client application 532 is generally capable of generating job requests. Once the client application 532 generates a job, the job may be submitted over the network 550 to file system 572 for execution. The operating system 530 may be any operating system capable of performing the functions described herein.

The multi-nodal system 570 contains a file system 572 and at least one node 590. Each job file 574 contains the necessary information for the nodes 590 to complete a submitted job. The updater 582 maintains a record of which job files are pending, i.e., being performed by a node 590. The network interface 584 connects to the network 550 and receives the job files 574 sent from the client system 520. Furthermore, as will be understood by one of ordinary skill in the art, any computer system capable of performing the functions described herein may be used.

The nodes 590 contain a computer processor 592 and memory 594. The computer processor 522 may be any processor capable of performing the functions described herein. Specifically, the computer processor 522 may be a plurality of processors such as what is illustrated in FIG. 1. Alternatively, computer processor 522 may be a multi-core processor with a plurality of processor cores with the structure shown in the processors 110 of FIG. 1. The memory 594 contains an operating system 598. The operating system 598 may be any operating system capable of performing the functions described herein. The memory 594 may include both the cache memory located within the processor 592 as well as one or more memory devices having blocks of memory associated with physical addresses, such as random access memory (RAM), read only memory (ROM), flash memory or other types of volatile and/or non-volatile memory.

Figure 6:
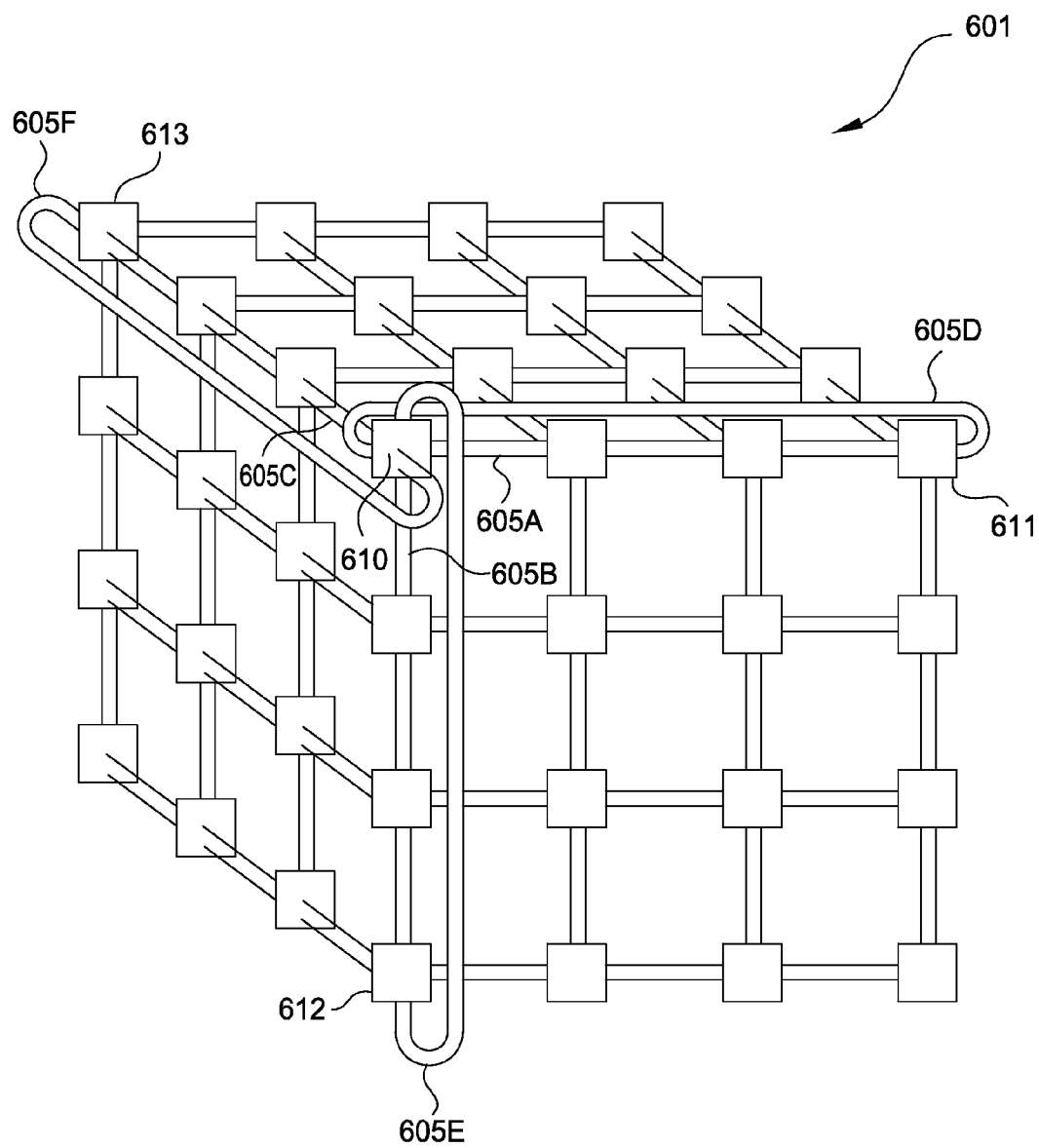
FIG. 6 is a diagram illustrating a multi-nodal job construct, according to embodiments of the invention.

FIG. 6 illustrates a 4×4×4 torus 601 of compute nodes 590, in which the interior nodes are omitted for clarity. Although FIG. 6 shows a 4×4×4 torus having 64 nodes, it will be understood that the actual number of compute nodes in a parallel computing system is typically much larger, for instance, a Blue Gene/L system includes 65,536 compute nodes. Each compute node in the torus 601 includes a set of six node-to-node communication links 605A-F which allow each compute node in the torus 601 to communicate with its six immediate adjacent nodes, two nodes in each of the x, y and z coordinate dimensions. In one embodiment, the parallel computing system 570 may establish a separate torus network for each job executing in the system 570. Alternatively, all the compute nodes may be connected to form one torus.

As used herein, the term "torus" includes any regular pattern of nodes and inter-nodal data communications paths in more than one dimension such that each node has a defined set of adjacent nodes, and for any given node, it is possible to determine the set of adjacent nodes of that node. An "adjacent node" of a given node is any node which is linked to the given node by a direct inter-nodal data communications path—i.e., a path which does not have to traverse through another node. The compute nodes may be linked in a three-dimensional torus 601, as shown in FIG. 6, but may also be configured to have more or fewer dimensions. Also, it is not necessary that the adjacent nodes for a given node are the physically closest nodes to the given node, although it is generally desirable to arrange the nodes in such a manner, insofar as possible.

In one embodiment, the compute nodes in any one of the x, y or z dimensions form a torus in that dimension because the point-to-point communication links logically wrap around. For example, this is represented in FIG. 6 by links 605D, 605E and 605F which wrap around from a last node in the x, y and z dimensions to a first node. Thus, although node 610 appears to be at a "corner" of the torus, node-to-node links 605A-F link node 610 to nodes 611, 612 and 613, in the x, y and z dimensions of torus 601.

CONCLUSION

Parallel computing environments, where threads executing in neighboring processors may access the same set of data, may be designed and configured to share one or more levels of cache memory. Before a processor forwards a request for data to a higher level of cache memory following a cache miss, the processor may determine whether a neighboring processor has the data stored in a local cache memory. If so, the processor may forward the request to the neighboring processor to retrieve the data. Because access to the cache memories for the two processors is shared, the effective size of the memory is increased. This may advantageously decrease cache misses for each level of shared cache memory without increasing the individual size of the caches on the processor chip.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product, the computer program product comprising:
   a non-transitory computer-readable storage medium having computer-readable program code embodied therewith, the computer-readable program code comprising computer-readable program code that when executed is configured to:
   search a first directory located within a first processor to determine if a first cache memory associated with the first processor contains required data necessary to perform an instruction executed by the first processor, wherein the first directory comprises an index of the data stored in the first cache memory;
   search a second directory located within the first processor to determine if a second cache memory associated with a second processor contains the required data, wherein the second directory comprises an index of the data stored in the second cache memory,
   upon determining that the data is located in the second cache memory, transmit a request from the first processor to the second processor to retrieve the data from the second cache memory; and
   upon determining that the data is not located in the first and second cache memories, transmit a request to a different memory associated with the first processor to retrieve the data.

2. The computer program product of claim 1, wherein the first cache memory is a level 1 cache of the first processor and the second cache memory is a level 1 cache of the second processor, and wherein the different memory is one of: a level 2 cache of the first processor and main memory.

3. The computer program product of claim 1, wherein the first processor is unable to write data to the second cache memory.

4. The computer program product of claim 1, wherein the first and second processors are located on a same semiconductor chip.

5. The computer program product of claim 4, further comprising computer-readable program code configured to transmit update information to coherently maintain the second directory with respect to a local directory associated with the second processor such that the second directory contains the same indexing information as the local directory, wherein, upon determining to update the local directory, the second processor transmits the update information to the first processor.

6. The computer program product of claim 1, wherein the steps of searching the first directory and searching the second directory occur simultaneously.

7. The computer program product of claim 1, further comprising computer-readable program code configured to determine whether to inject the request to retrieve the data from the second cache memory into an execution unit of the second processor based on injection criteria.

8. The computer program product of claim 7, further comprising computer-readable program code configured to:
   upon determining not to inject the request into the execution unit, store the request in a queue; and
   upon determining to inject the request into the execution unit, inject the request into the execution unit of the second processor such that the data is retrieved from the second cache memory and transmitted to an execution unit of the first processor.

9. A system comprising a first processor and a second processor, comprising:
   a first cache memory associated with the first processor;
   a second cache memory associated with the second processor;
   a first directory in the first processor comprising an index of the data stored in the first cache memory, wherein searching the index of the first directory indicates whether the first cache memory contains required data necessary to perform an instruction executed by the first processor; and
   a second directory in the first processor comprising an index of the data stored in a second cache memory of the second processor, wherein searching the index of the second directory indicates whether the second cache memory contains the required data,
      wherein, upon determining that the data is located in the second cache memory, the first processor is configured to transmit a request to the second processor to retrieve the data from the second cache memory, and
      wherein, upon determining that the data is not located in the first and second cache memories, the first processor is configured to transmit a request to a different memory associated with the first processor to retrieve the data.

10. The system of claim 9, wherein the first cache memory is a level 1 cache of the first processor and the second cache memory is a level 1 cache of the second processor, and wherein the different memory is one of: a level 2 cache of the first processor and main memory.

11. The system of claim 9, wherein the first processor is unable to write data to the second cache memory.

12. The system of claim 9, wherein the first and second processors are located on a same semiconductor chip.

13. The system of claim 12, wherein the second directory is located on the same semiconductor chip as the first processor, further comprising transmitting update information to coherently maintain the second directory with respect to a local directory associated with the second processor such that the second directory contains the same indexing information as the local directory, wherein, upon determining to update the local directory, the second processor transmits the update information to the first processor.

14. The system of claim 9, wherein the steps of searching the first directory and searching the second directory occur simultaneously.

15. The system of claim 9, further comprising determining whether to inject the request to retrieve the data from the second cache memory into an execution unit of the second processor based on injection criteria.

16. The system of claim 15, further comprising:
   upon determining not to inject the request into the execution unit, storing the request in a queue; and
   upon determining to inject the request into the execution unit, injecting the request into the execution unit of the second processor such that the data is retrieved from the second cache memory and transmitted to an execution unit of the first processor.

* * * * *